Aug. 26, 1947.  R. M. ALVERSON  2,426,171
PROTECTIVE DEVICE FOR ROCKET COMPONENTS
Filed Sept. 28, 1944
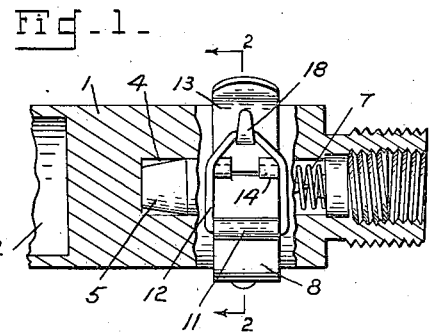
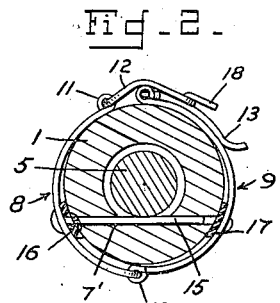
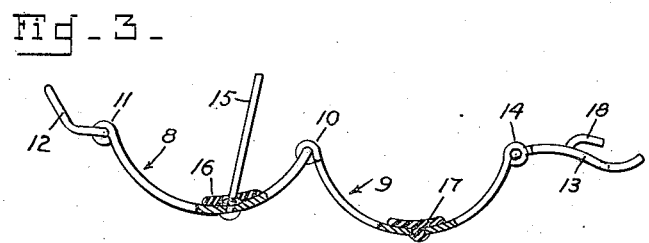
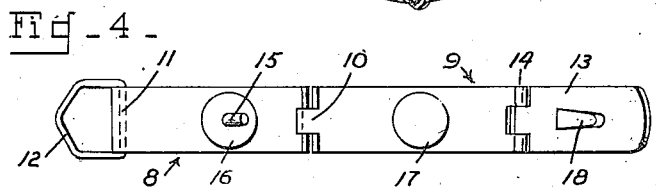
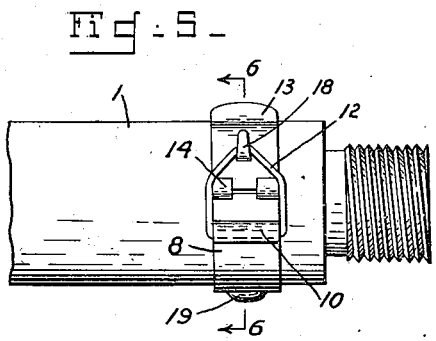
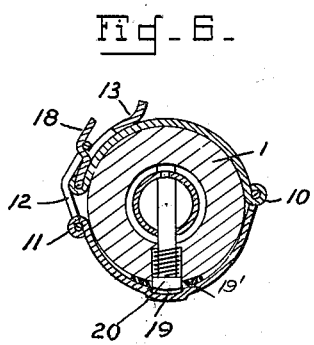
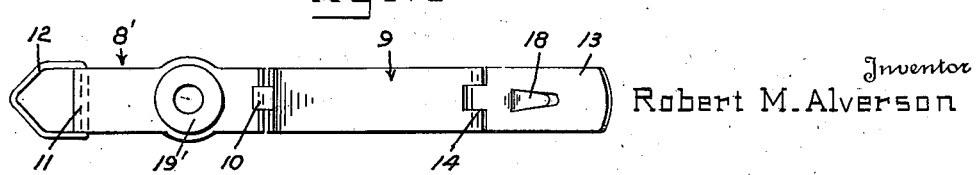
Inventor
Robert M. Alverson Patented Aug. 26, 1947

2,426,171

UNITED STATES PATENT OFFICE 2,426,171

PROTECTIVE DEVICE FOR ROCKET COMPONENTS

Robert M. Alverson, Arlington, Va.

Application September 28, 1944, Serial No. 556,245

2 Claims. (Cl. 102—81.6)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a protective device for rocket and grenade components. The holes in the walls of the rocket and certain grenade components for the insertion of the safety or arming-pins are such as to enable the pins to be withdrawn with comparative ease before the launching of the rocket or the throwing of the grenade. These pins do not fit the holes with sufficient tightness to exclude water which when entering the hole reaches the striker and primer cavity and interferes with the intended operation of the organization. Therefore, the object of this invention is to provide a device adapted to carry a safety or arming-pin, and which includes a number of washers or discs of compressible resilient waterproof material, such as rubber which when the device is attached to the rocket component cover the pin holes or the crevices around the pin and completely seal the hole and crevice against the passage of water.

While the invention about to be described is especially adapted for use in connection with a rocket tube of known construction, it will become apparent that it is also adapted for use in connection with any cylindrical projectile component, wherein there is a striker or other firing device held safe by an arming-pin normally holding the firing devices in unarmed position.

In the drawings illustrating the invention:

Figure 1 is a side elevation of a partial section of the front end of a rocket tube showing the application of the present invention thereto, and locked thereon.

Figure 2 is a cross section of Figure 1 taken on the line 2—2 of that figure.

Figure 3 is an edge view of the band in spread position.

Figure 4 is a plan view of the band looking at the inside thereof.

Figure 5 is a view of the device slightly modified in form and adapted for use in connection with a rocket tube employing a slightly different arming-pin.

Figure 6 is a cross section of Figure 5 on the line 6—6 of Figure 5.

Figure 7 is a plan view of the spread band shown in Figure 6, looking at the inside thereof.

Referring to the drawings and particularly Figures 1-4, the numeral 1 designates the front end of a rocket tube provided with a threaded boss for screwing it on to the explosive charge container or body, and a chamber 2 for the rocket charge. The tube has a bore 4 in which the striker 5 is slidably fitted and in which the striker is normally separated from the primer or detonator 6 by a spring 7, all as usual.

The tube has a hole 7 in its walls for the reception of an arming-pin which engages an annular groove in the striker, which pin will presently be more particularly referred to in connection with the subject of this invention.

The described structure is well known and forms no part of this invention.

The present invention contemplates the provision of a band, preferably of thin metal, about one-half inch wide provided with resilient compressible waterproof means for sealing the arming-pin hole in the rocket tube and the crevice around the pin, and which also carries the arming pin. The band comprises two arcuate sections 8 and 9 joined by hinge 10. The section 8 is provided with an eye 11 in which is hinged the loop or buckle element 12 which cooperates with the other buckle member or element 13 in an eye 14 of the band section 9. To the section 8 is riveted the arming pin 15 around which and in close relation with the inside of the ring, is a washer 16 of resilient compressible waterproof material, such as rubber. The band section 9 has a disc 17 of the same material, attached to its inner face, both the washer and the disc being adapted to be forcefully compressed between the band and tube when the band is fastened on the tube, one sealing the crevice around the pin and the other closing the arming-pin hole opposite the head of the pin, as shown in Figure 2.

The buckle member 13 is provided with a tongue 18 struck out of its central portion and bent upwardly and laterally, the tongue cooperating with the loop 12 in fastening the band to the tube. The washer 16 and disc 17 are so located on the band sections that they will be substantially opposite each other when the band is locked on the tube. This is important in that it prevents creeping of the washer and disc in tightening the band, and assures their uniform compression and consequent perfect seal.

There is but little difference between the modification illustrated in Figures 5 and 7, and the construction in the other figures. The band here is shown as provided in section 8' with a circular depression or sump 19 for the accommodation of the head 20 of the arming pin, which head in this form extends a little distance beyond the outer periphery of the tube, the pin being adapted to be expelled by spring in the wall of the tube when it is released by setback of the missile. A washer 19' is provided adjacent the perimeter of the sump through which washer the head of the pin extends, the washer being thus positioned to be compressed when the band is tightened.

I have found it convenient and advantageous to attach the arming-pin to one of the sections of the band and to employ a washer surrounding the pin, as shown in Figures 2 and 3, but this may be replaced by a disc like that on section 9 adapted to come opposite a pin whose end is flush with the tube or other similar member, where the pin is adapted to be sheared, for instance, upon impact of the missile.

The operation is simple and may be expeditiously and quickly performed. It entails merely the placing of the band sections around the tube with the arming-pin 15 inserted through the arming-pin hole into engagement with the annular groove in the striker, and then bringing the ends of the sections together and locking them by the coacting buckle elements which will bring the washer and disc to the positions shown in Figure 2. In the case of the modification, Figures 5-7 the washer is placed around the head of the disc and when the band is fastened the washer will be compressed between the tube and the band and seal the crevice around the pin head.

I claim:

1. A device of the character described adapted for attachment to a cylindrical missile component having an aperture for the reception of an arming-pin, comprising a band adapted for attachment to said component and formed of two arcuate sections of resilient material hinged together, a disc of compressible waterproof material carried by one section and an arming-pin carried by the other for reception in said aperture, a washer of compressible material surrounding the pin, said disc and washer being adapted to be compressed between the band and said component to seal the aperture in the missile component when the band is tightened and locked on said component, and means for tightening and locking said band.

2. In a device of the character described adapted for attachment to a cylindrical missile component having an aperture for the reception of an arming-pin, a band of resilient material adapted for attachment to said component and formed of a plurality of arcuate sections hinged together, compressible waterproof means on the inner sides of said sections and adapted to seal said aperture when the band is positioned on said component and means for tightening the band to compress said compressible means and simultaneously fasting the free end of said band sections, said compressible sealing means being so positioned on the band sections that they come substantially opposite each other when the band is locked on the missile component.

ROBERT M. ALVERSON.

REFERENCES CITED

The following references are of record in the file of this patent:

UNITED STATES PATENTS

| Number | Name | Date |
|---|---|---|
| 2,100,698 | Morner | Nov. 30, 1937 |
| 2,365,246 | Cardini | Dec. 19, 1944 |
| 2,219,161 | Jacobs | Oct. 22, 1940 |
| 712,019 | Thomas | Oct. 28, 1902 |
| 2,304,038 | Thompson | Dec. 1, 1942 |

FOREIGN PATENTS

| Number | Country | Date |
|---|---|---|
| 548,304 | Great Britain | Oct. 6, 1942 |